United States Patent
Wexler et al.

(10) Patent No.: US 6,989,221 B2
(45) Date of Patent: Jan. 24, 2006

(54) PHOTOGRAPHIC ARTICLE

(75) Inventors: Ronald M. Wexler, Rochester, NY (US); Jeffrey L. Hall, Rochester, NY (US); Kenneth A. Parulski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/037,409

(22) Filed: Jan. 18, 2005

(65) Prior Publication Data

US 2005/0123866 A1 Jun. 9, 2005

Related U.S. Application Data

(62) Division of application No. 10/389,349, filed on Mar. 14, 2003.

(60) Provisional application No. 60/448,084, filed on Feb. 17, 2003.

(51) Int. Cl.
*G03C 5/06* (2006.01)
*G03C 5/50* (2006.01)
*G03C 11/02* (2006.01)

(52) U.S. Cl. .................. 430/22; 430/11; 430/15; 430/323; 430/333; 430/394; 430/952

(58) Field of Classification Search ............... 430/11, 430/15, 22, 394, 952, 323, 333; 396/323, 396/333
See application file for complete search history.

(56) References Cited

U.S. PATENT DOCUMENTS

| 1,282,829 | A |   | 10/1918 | Hernandex-Mejia |
| 2,558,999 | A |   | 7/1951  | Aldrich |
| 3,283,685 | A | * | 11/1966 | Cummins ............... 396/333 |
| 3,940,778 | A |   | 2/1976  | Craig et al. |
| 4,488,794 | A | * | 12/1984 | Dolgow et al. ............ 396/333 |
| 4,954,429 | A |   | 9/1990  | Urata |
| 4,966,285 | A | * | 10/1990 | Otake et al. ............... 206/455 |
| 5,036,398 | A |   | 7/1991  | Westell |
| 5,043,756 | A |   | 8/1991  | Takabayashi et al. |
| 5,258,859 | A |   | 11/1993 | Wada et al. |
| 5,436,694 | A | * | 7/1995  | Ishikawa et al. ............ 355/75 |
| 5,482,896 | A |   | 1/1996  | Tang |
| 5,530,269 | A |   | 6/1996  | Tang |
| 5,583,601 | A |   | 12/1996 | Peterson |
| 5,801,852 | A | * | 9/1998  | Truc et al. .................. 358/502 |
| 5,867,170 | A |   | 2/1999  | Peterson |
| 5,960,227 | A |   | 9/1999  | Kurokawa et al. |
| 6,215,547 | B1 |  | 4/2001  | Ramanujan et al. |
| 6,270,935 | B2 | * | 8/2001 | Tatsumi et al. ............ 430/22 |
| 6,330,018 | B1 |  | 12/2001 | Ramanujan et al. |
| 6,505,979 | B2 |  | 1/2003  | Twist et al. |
| 6,520,694 | B1 |  | 2/2003  | Hall et al. |

FOREIGN PATENT DOCUMENTS

| EP | 1033 873 A2 | 2/2000 |
| JP | 08 324175 A | 4/1997 |

\* cited by examiner

*Primary Examiner*—Richard L. Schilling
(74) *Attorney, Agent, or Firm*—David A. Novais

(57) ABSTRACT

A photographic article. According to one embodiment, the photographic article comprises: a first image area comprising a photographic film negative of an image; and a second image area, different than the first image area, comprising a positive image of the image.

2 Claims, 11 Drawing Sheets

FILM WRITER OPTIONS FOR FILM MEDIA AND PROCESS

| DESIRED IMAGE FROM FILM WRITER IS: | IF CURRENT FILM/PROCESS USED IN FILM WRITER IS TECHNOLOGY SPECIFIC | IF ONE FILM ONLY IS USED IN THE FILM WRITER |
|---|---|---|
| COLOR NEGATIVE | COLOR NEGATIVE FILM WITH COLOR NEGATIVE PROCESS | COLOR NEGATIVE IMAGE WITH NEGATIVE WORKING PROCESS |
| REVERSAL | REVERSAL FILM WITH REVERSAL PROCESS | REVERSAL IMAGE WITH NEGATIVE WORKING PROCESS |
| BOTH COLOR NEGATIVE AND REVERSAL ON ONE FILM | NOT AVAILABLE | COLOR NEGATIVE AND REVERSAL IMAGE WITH NEGATIVE WORKING PROCESS |

*FIG. 8*

PHOTOGRAPHIC ARTICLE

This is a divisional application of U.S. Ser. No. 10/389,349 filed Mar. 14, 2003.

CROSS REFERENCE TO RELATED APPLICATION

Priority is claimed from Provisional Application U.S. Ser. No. 60/448,084 filed on Feb. 17, 2003, entitled "AUTOMATED IMAGE PROCESSING SYSTEM AND METHOD".

Reference is made to commonly assigned application U.S. Ser. No. 10/389,419, entitled "AUTOMATED IMAGE PROCESSING SYSTEM AND METHOD", and filed on common date herewith in the names of Wexler et al, and which is assigned to the assignee of this application.

FIELD OF THE INVENTION

The invention relates generally to the field of imaging. More specifically, the invention relates to a system and method of processing images.

BACKGROUND OF THE INVENTION

Many individuals enjoy the art of photography to capture images. Different techniques can be used to capture images. Conventional photosensitive film (such as 35 mm film, APS film) can be employed wherein the exposed photosensitive film is processed to generate a hardcopy print. With the advent of digital photography, a digital camera can be employed to capture digital images. A hardcopy print of the digital images can be made using known techniques, for example, using a printer or transmitting the digital image to an on-line service provider for printing, for example, Ofoto, Inc., A Kodak Company.

An individual may wish to save the captured image. For example, the image might be of a family member. For conventional film and processing, a film negative, a film positive, a paper hardcopy print, or other archival storage media is generated during the processing of the conventional photosensitive film. In the case of a film negative, additional hardcopy prints can be generated at the same time as the original processing or at some later time after the original processing. Accordingly, the film negative provides the individual/user with a long-term archival storage medium.

However, for archiving digital images, the user transfers the digital image to a digital storage media such as a magnetic hard drive, a DVD, a CD, a floppy disk, an optical disc, or the like for storage. There exists a concern that these digital storage media, which are available today, may not be available for the long term. That is, with technology changing quickly, individuals may not be able to access their digital images in future years when today's existing technology is no longer available. Examples to consider: turntables for record albums; 8 track players; beta max format VCR players for Beta format videotapes; and players for video camcorder tapes. For computer systems, personal computers (PCs) were originally equipped with 5¼ inch floppy disk drives that have now been typically replaced with 3½ inch floppy disk drives. If a user did not transfer stored digital image information from older devices which are now obsolete to newer devices that are contemporary, then the digital information stored on the older disks can no longer be accessed with contemporary home PCs. Such obsolescence is not confined only to hardware. Software programs can also evolve with some versions of the same named software program no longer being compatible with older versions because of changes in the fundamental code or changes in the stored file structure that results in files no longer being usable if stored in older formats.

Accordingly, there exists a need for a system and method of generating an archival image for an individual/consumer's digital image wherein this archival image can be employed for long-term archivability. It is preferred that this archival image is configured in a human-readable form and is optically printable, that is, printed by transmission of light through the archival image. Such a system and method preferably provides ease of use for the consumer and be distributable in areas frequented by the consumer.

The present invention provides such a system and method of generating an archival image for an individual/consumer's digital image. In a preferred embodiment, the system and method are automated so as to be readily available. The system and method can be used to fulfill other consumer unmet needs in addition to archival storage. For example, the system and method of the present invention can be used to catalog images as a simple library of selected digital images or it can be used to aggregate images using a common theme or event. In this way, the consumer can select those digital images of interest, convert them to archival film-based storage and manage the archival film storage in a way familiar to the consumer today but having the added value that the images are already collated to a desired theme or event.

SUMMARY OF THE INVENTION

An object of the present invention is to provide a photographic article having an archival image that provides long-term archivability.

Another object of the present invention is to provide such a photographic article which further provides an archival image in human-readable form.

A further object of the present invention is to provide such a photographic article which can be generated using the same process.

Yet a further object of the present invention is to provide such a photographic article which is generated on a single, unitary medium.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the present invention, there is provided an photographic article. The photographic article comprises: a first image area comprising a photographic film negative of an image; and a second image area, different than the first image area, comprising a positive image of the image.

According to another aspect of the present invention, there is provided an photographic article. The photographic article is comprised of a single photosensitive medium, and comprises: a first image area comprising a photographic film negative of an image; and a second image area, different than the first image area, comprising a positive image of the image.

According to yet another aspect of the present invention, there is provided a photographic article, comprising a single image area having a first image, the first image comprising a photographic film negative of a second image interlaced with a positive image of the second image.

According to still yet another aspect of the present invention, there is provided a method of making a photographic image. The method comprises the steps of: generating a photographic film negative of a first image; generating a positive image of the first image; and processing the film negative and positive image through a same chemical process.

BRIEF DESCRIPTION OF THE DRAWINGS

The foregoing and other objects, features, and advantages of the invention will be apparent from the following more particular description of the preferred embodiments of the invention, as illustrated in the accompanying drawings.

FIG. 8 shows a table of film writer options for film media and associated processing cycles.

DETAILED DESCRIPTION OF THE INVENTION

Figure 1:
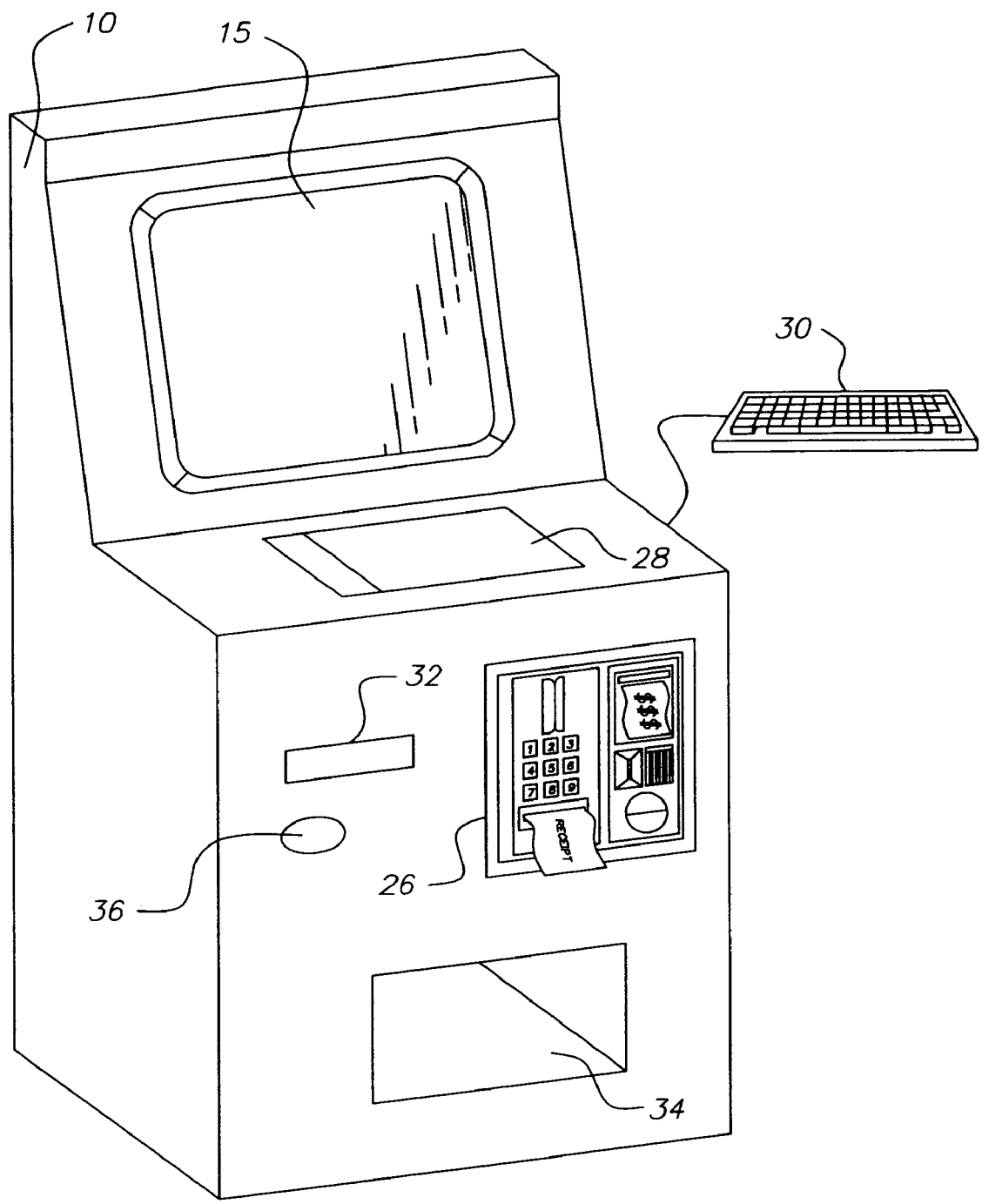
FIG. 1 shows an image processing system in accordance with the present invention configured, for illustrative purposes, as a kiosk.

The following is a detailed description of the preferred embodiments of the invention, reference being made to the drawings in which the same reference numerals identify the same elements of structure in each of the several figures.

Figure 2:
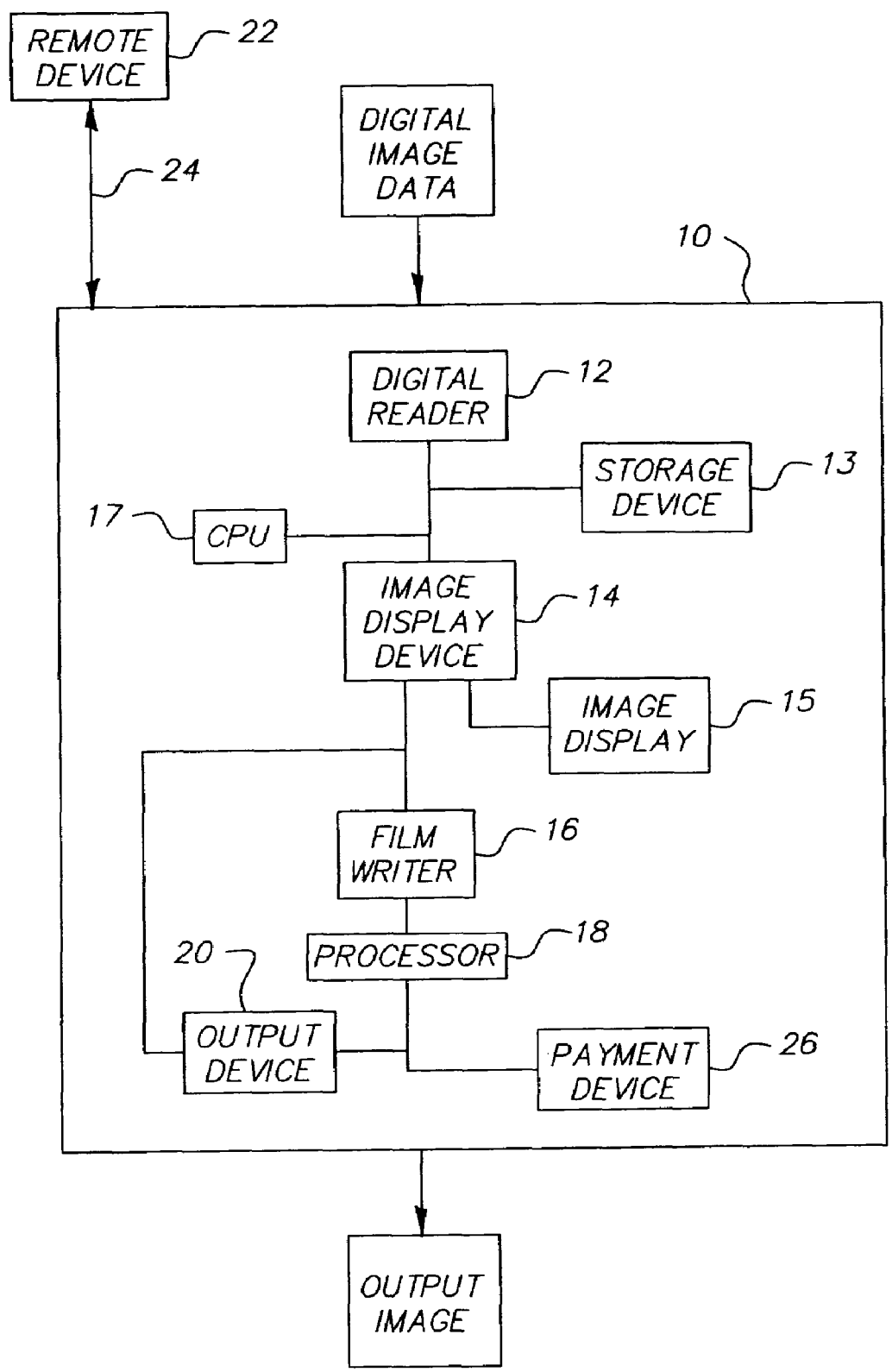
FIG. 2 shows a diagram of included functions of the system of FIG. 1.

Referring to FIGS. 1 and 2, FIG. 1 generally shows an image processing system 10 in accordance with the present invention while FIG. 2 generally shows a diagram of included functions of system 10. As illustrated, system 10 can be configured as a kiosk or other stand-alone image processor. System 10 includes a digital reader 12, a storage device 13, an image display device 14 having an image display 15, film writer 16, a central processing unit (CPU) or computer 17, processor 18, an output device 20, and a payment device 26. System 10 can also include a scanner 28, keyboard, 30, input port 32, and a delivery area 34, as best shown in FIG. 1. System 10 can be in communication with a remote device 22 by means of a communication network 24. Communication network 24 can include, but is not limited to, modem, LAN, wireless, radio frequency, BLUETOOTH, cable, DSL, internet, fiber, firewire, and USB. A computer (not shown) can be used to manage the flow of information and functionality of the components of system 10. The elements of system 10 are more particularly described below.

Digital image data can be stored in digital form on a medium known to those skilled in the art, including but not limited to, a non-removable medium such as a hard drive, or a removable medium such as a memory card, a memory stick, an optical disc, compact disk (CD), Picture CD, a floppy disk, DVD, magnetic tape, microdrive, and the like. If the digital image data is disposed on a removable medium, then system 10 can include input port 32 for receiving removable medium. Alternatively, scanner 28 can be provided for receiving a user-supplied visual image and converting the visual image into digital form. It is recognized that system 10 can include scanner 28, or the scanner can be remote to system 10. Other means of providing image data in digital form may be known to those skilled in the art.

Alternatively, as will be more particularly described below, system 10 may include means 36 for receiving exposed (but unprocessed) photosensitive medium, for example, 35 mm or APS film. In FIG. 1, means 36 is shown as a slot or opening in system 10.

The digital image data need not be local, that, is, the digital image system 10 can be in communication with remote device 22 by means of a communication network 24 for accessing remotely located digital image data. For example, the digital image data may be stored on a consumer PC or a server of an on-line service provider or a server of a retail photofinisher or a server of a wholesale photofinisher.

As will become apparent, it is preferable that the digital image data is not of a lower resolution, rather, that of a high resolution.

Digital reader 12 is adapted to access the digital image data defining a digital image. As such, digital reader 12 can be configured as a communication device to receive digital data by means of communication network 24, a memory card reader, a memory stick reader, an optical disc reader, a CD reader, a floppy disk reader, a DVD reader, a microdrive reader, a hard drive, or the like. For devices such as digital still cameras equipped with communications ports such as obtained with FIREWIRE or USB, digital reader 12 can be equipped with a complementary hookup to such devices to afford direct transfer of images stored on the digital still camera. The communication device can be configured as a mobile device, for example, a personal digital assistant (PDA) or cell phone, and the digital data can be accessed by means of wireless communication.

Particular devices can be employed to access the digital image data. For example, if the digital image data is disposed on a memory card disposed within a digital camera, digital reader 12 can be configured as a docking station (such as the Kodak EasyShare manufactured by Eastman Kodak Company) wherein the placement of the digital camera in the docking station can provide for the automatic or semi-automatic transfer of the digital image data from the memory card to system 10.

Storage device 13 includes memory for storing the digital image data. That is, once the digital image data is received by system 10, the digital image data is stored on storage device 13.

Image display device 14 includes image display 15 for displaying the digital image data. Display 15 can be of any size, though preferably of a size suitable for visually identifying/distinguishing the content of the digital image data when displayed on display 15.

CPU 17 can operate system 10 including providing image processing, and/or operating/monitoring payment transactions.

Film writers are stand alone devices that write digital information onto film. These devices exist today but are not available to a consumer. For example, cinematographers use film writers to enter special effects into the story line recorded on the film.

Film writer 16 is adapted to write the digital image data to a photosensitive medium to generate an exposed film image. Various photosensitive medium can be employed with the system of the present invention, including but not limited to, color negative film, color reversal film, black and white film, electronic output film, digital output film, intermediate film as used in the motion picture industry, and the like. Preferably, the medium employed is a film based optical medium since the use of a film based optical medium provides the advantages of ready availability in the marketplace, well known and proven designs, known keeping characteristics for archival storage, and familiarity in the market place thus enhancing the reliance of this medium as an archival storage medium.

Film writers are known in the art, and such film writers can be employed with the system of the present invention. These devices can contain three different light sources: one that exposes the red portion of an image, one that exposes the green portion, and one that exposes the blue portion. Examples of electronic film writer devices are the Saphire and Solitaire by MGI, Lightjet by CSI, Miruswriter Turbopro II by Mirus Industries, and LVT by Dice. Commercial motion picture film recorders include Kodak's Cineon and Lightning 2, Autologic's LUX and Arri's Arrilaser. The film writers have different types of light sources having different spectral power distributions. The Saphire, Solitaire, and Miruswriter include CRT light sources, Lightjet includes laser sources, and the LVT includes LED sources. Other known film writers include an LCD area array writer as described in U.S. Pat. Nos. 6,215,547; 6,330,018; 6,646,716; 6,580,490 and 6,762,785 and an overfilled polygon laser writer as described in commonly assigned U.S. Patent application U.S. Ser. No. 10/066,934. Other light sources for use in film writers may include organic light emitting diodes, for example as described in U.S. Pat. Nos. 5,530,269 and 5,482,896, and organic laser diodes, for example as described in U.S. Pat. Nos. 6,658,037; 6,674,776 and 6,687,274 and U.S. Patent applications U.S. Ser. No. 10/272,605 and U.S. Ser. No. 10/395,730. Alternatively, a four color film writer, such as those described U.S. Pat. No. 6,762,785 may be used.

In operation, information is supplied to the device that digitally describes the original scene's content. This information typically originates from either a film-based camera image, or a digital camera, or a computer. In the case where the film-based camera image is the source of the information to the device, the image is scanned so that digital values can be supplied to the device. The supplied information is then used to expose an output film. In the case where the original image is recorded using a digital camera or is generated by a computer, the information is already in digital form.

Signal processing of the supplied information is performed within the device to determine the intensity and time of exposures that the three light sources are to give the output film. Typically, when the film is exposed, the film writer device scans over the entire area of the film to expose each color record of the output film. The extent of exposure of the output film, and hence, the amount of dye formation, depends in part on the spectral sensitivity distributions of the film and the spectral power distributions of the light sources of the electronic film writer device.

U.S. Pat. No. 4,954,429 relates to a film for laser recording. The disclosed film is spectral sensitized to minimize unwanted dye formation to prevent "color mixing". The result is obtained from the specific ratio of the sensitivity of the light sensitive emulsion layers constituting the film.

Often films which are exposed by electronic film writer devices are films which are spectrally optimized to be exposed by natural light radiation, not the light source of an electronic film writer device. As a result, when such films are used as the imaging media from an electronic film writer device, extra 'scans' by the light sources can be needed. As such, extra scans can be required for proper exposure by the green light source of the film writer device. When conventional reversal films are exposed by an electronic film writer device, extra scans by the red light source are also often required to decrease the amount of cyan density that forms in the low density region of images. These extra scans undesirably increase the completion time of the image. This affects the throughput of the machine. Therefore, although existing conventional color negative films or conventional reversal films can be used in the film writer, it is preferred that the spectral sensitivity of the film used in the film writer is matched to the spectral emission of the film writer itself.

Processor 18 is adapted to chemically process the exposed film image generated by film writer 16 in order to generate a film output image. An example of a known processor suitable for use with system 10 is disclosed in U.S. Pat. No. 5,960,227 (Kurokawa). Kurokawa relates to a photosensitive material processing apparatus that processes the film while the film is attached to a cartridge as might occur if the film used with the film writer is based on APS film and cassette designs. The small volumes of processing solutions used in this elongated processor and its use of fresh (non-seasoned) developer are particularly useful for applications of the present invention. Another processor example is U.S. Pat. No. 5,043,756 (Takabayashi). Takabayashi, relates to a photosensitive material processing apparatus that uses a small reservoir tubular processing tank to process silver halide photosensitive material. The small volume of the tank design is useful for a kiosk-type application of the present invention. In both of these devices, the processor is designed to work with one type of film and one chemical processing sequence. Yet another example of a processor suitable for use with the present invention is a processor referred to as a wave processor, disclosed in U.S. Pat. No. 6,505,979, commonly assigned.

This processor employs a single, self-cleaning processing reservoir that can be used with a chemical processing configuration. Other suitable processors may be known to those skilled in the art.

In the preferred embodiment, the film output image is a photographic negative. A photographic negative is preferred since, as indicated in the background section above, there exists a need for an archival image for a digital image wherein this archival image can be employed for long-term archivability. A photographic negative provides such an archival image, and is optically printable. Although such an output image can be visually scanned, the output image is itself a negative image of the scene. In another preferred embodiment of this invention, the image is rendered as a positive image of the scene (e.g., a photographic film positive), thus providing an easily human readable rendition of the scenes contents and color.

In addition to generating a photographic film negative image or a positive film image, system 10 can generate other output images using the digital image data, the exposed film writer image, and/or the original film image. These other output images can include, but are not limited to, image bearing products such as hardcopy prints (such as a 4×6, 8×10, and index print), mug, tee-shirt, puzzle, greeting card, business card, and poster. Therefore, system 10 can include additional output devices 20 to generate these output images. These output devices include silver halide printers, thermal printers, inkjet printers, electrophotographic printers, and the like. Accordingly, output device 20 is dependent on the output image that is to be generated. For example, if film output image is a hardcopy print, output device 20 can be configured as a printer.

It is noted that system 10 can be configured so that output device 20 can also be accessed directly.

System 10 can optionally include payment device 26 to receive payment for the operation of system 10, including the generation of the output image. Such a device can facilitate use of system 10 as a stand-alone walkup service, such as is available in a kiosk-like configuration. As best illustrated in FIG. 1, payment device 26 can include one or more payment mechanisms for accepting payment from a user. One payment mechanism is a card reader, which includes a slot for accepting a debit/credit card or a keypad for entering a debit/credit card number. A receipt area can be provided for providing a receipt to the user. Another payment mechanism is configured to accept cash payment or any other form of acceptable payment. A further payment mechanism can include a bar-coded or RF-enabled keychain fob (also referred to as a key tag; the MOBIL SPEEDPASS is an example of a RF-enabled key tag). Other payment mechanisms may be known to those skilled in the art.

In another stand-alone embodiment, the elements of system 10 can be co-located or dispersed provided that film writer 16 and processor 18 are mechanically linked. For example, an order fulfillment station comprised of display device 14, image display 15 and payment device 26 can be disposed at an order taking station while output device 20 can be disposed at another location or at the same location/ site to deliver the order. The digital image data can be accessed remotely as by employing remote device 22 and communication network 24, or the digital image data can be read using digital reader 12 located at the order taking station.

Figure 3:
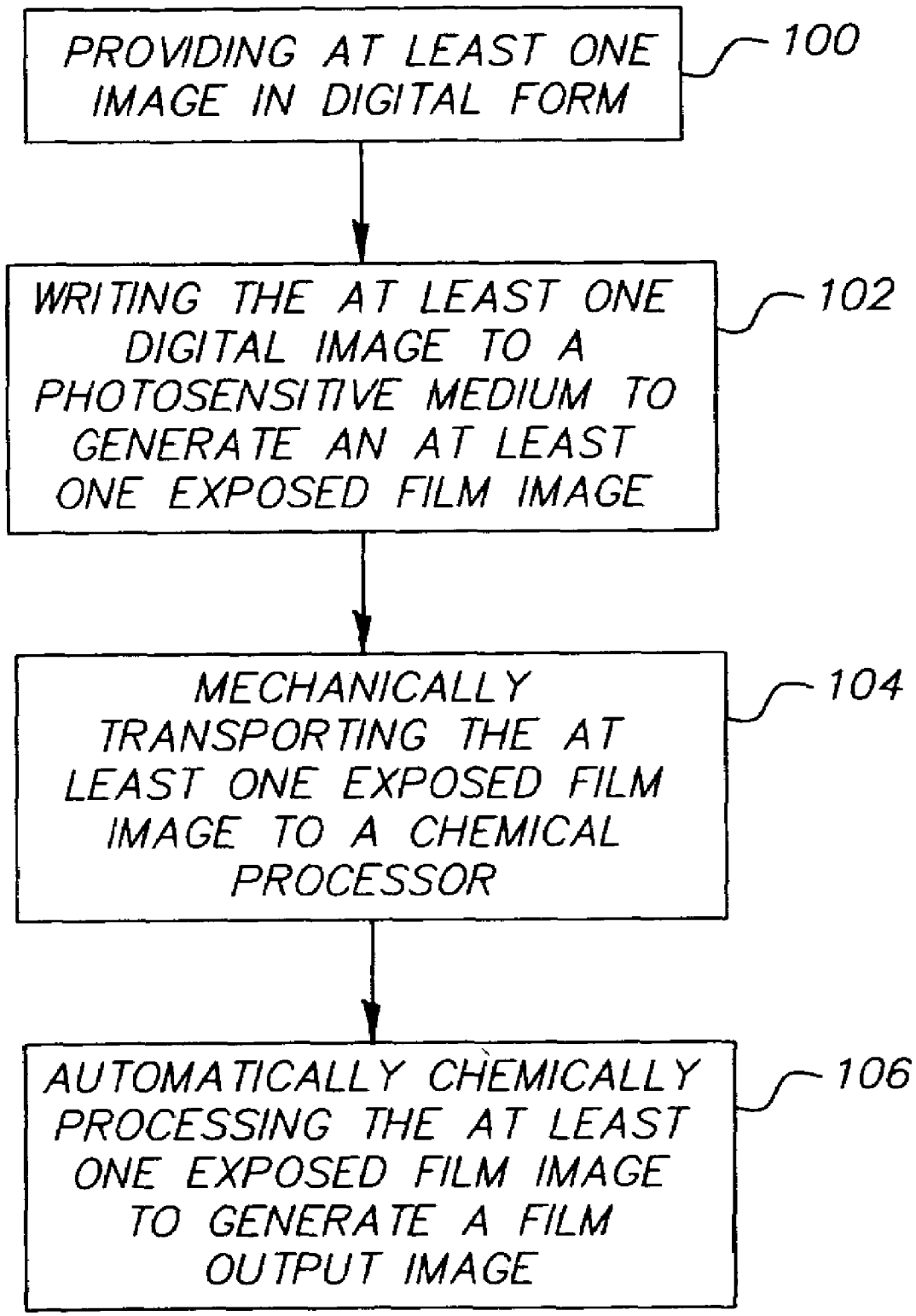
FIG. 3 shows a flow diagram of a method in accordance with a first embodiment of the present invention.

FIG. 3 shows a flow diagram of an image processing method in accordance with a first embodiment of the present invention employing system 10 of FIGS. 1 and 2. At step 100, at least one image in digital form is accessed. At step 102, the at least one digital image is written to a photosensitive medium to generate an at least one exposed film image. The at least one exposed film image is transported to a mechanically linked chemical processor (step 104), wherein the at least one exposed film image is automatically chemically processed to generate a film output image (step 106). The film output image is then provided to the user, for example, immediately by means of an opening (delivery area 34 shown in FIG. 1 as an opening) in system 10 or at a later time by mail delivery to the user at a predetermined address. Each of the steps is now more particularly described.

At step 100, at least one image in digital form is accessed. As indicated above, the digital image data can be stored in digital form on a medium known to those skilled in the art and read by system 10 using digital reader 12.

Once accessed, at step 102 the at least one digital image is written to a photosensitive medium to generate an at least one exposed film image. Writing the digital image to a photosensitive medium is accomplished using film writer 16. As indicated above, various photosensitive media can be employed with system 10, with film writer 16 being selected to be compatible with the photosensitive medium employed.

Figure 4A:
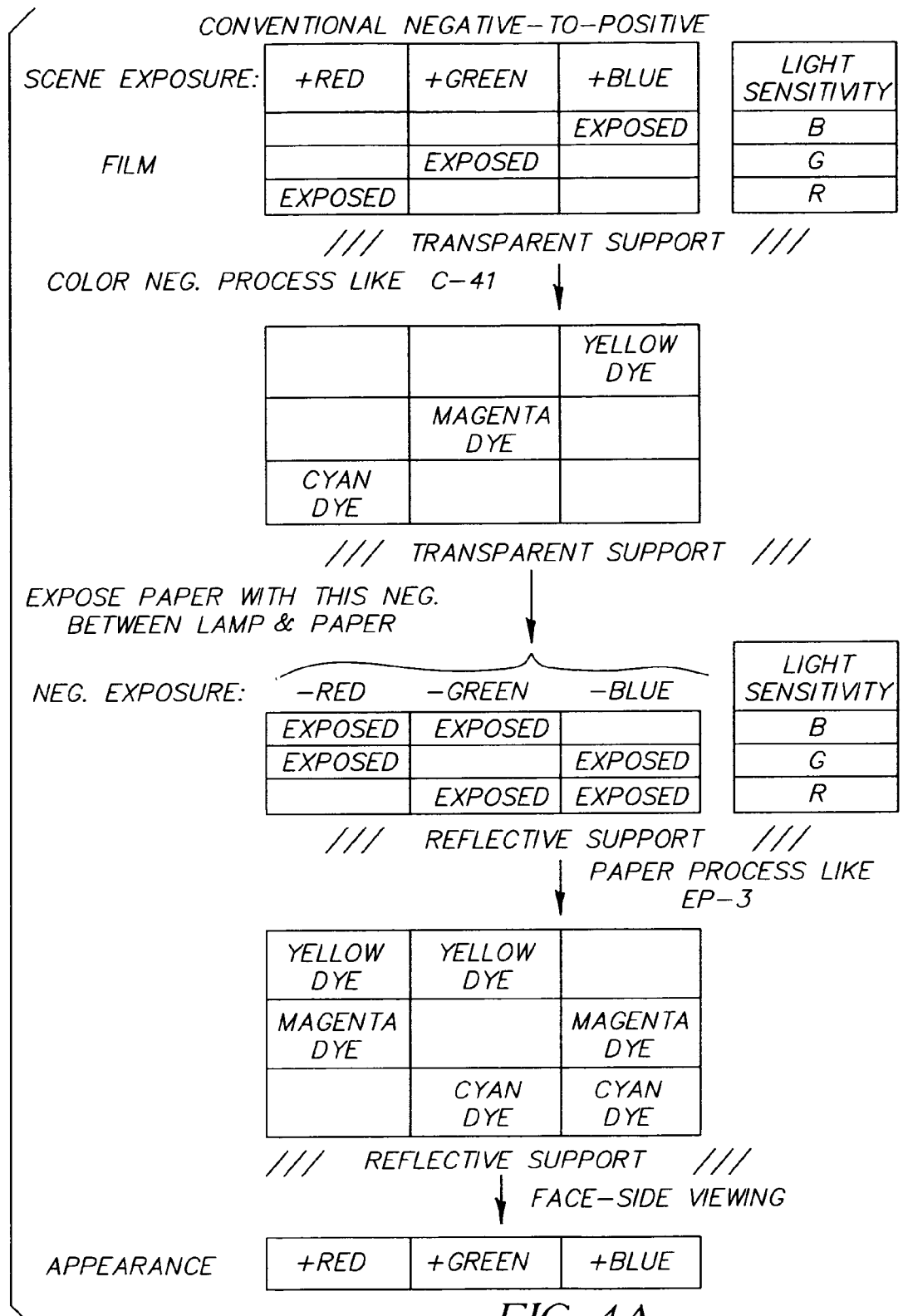
FIGS. 4a and 4b show a general description of subtractive color processes used to generate a color hardcopy image; conventional negative-to-positive process is shown in FIG. 4a and direct positive is shown in FIG. 4b.
Figure 4B:
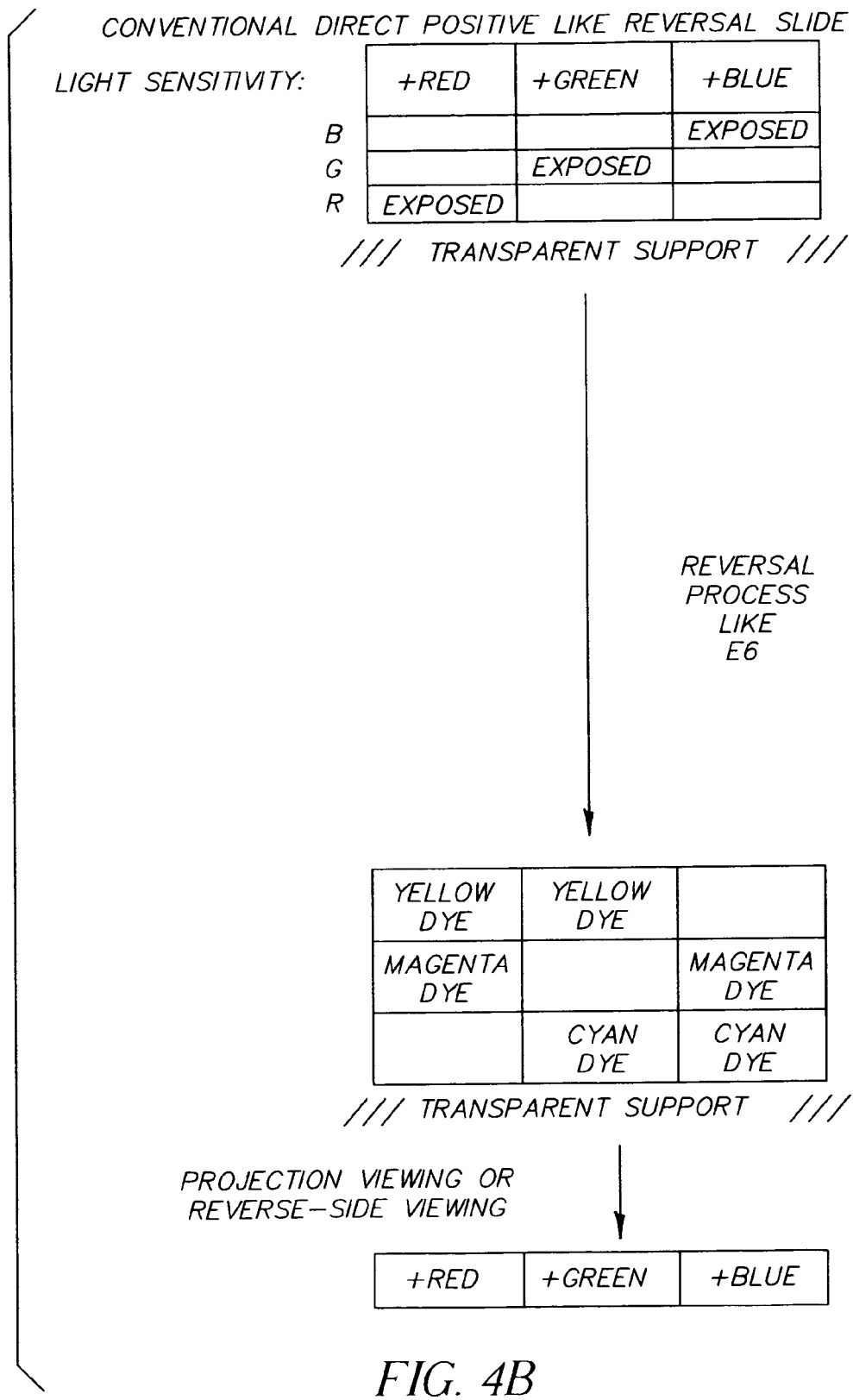

Referring now to FIGS. 4*a* and 4*b*, there is shown background information on existing films. More particularly, FIGS. 4*a* and 4*b* provide a general description of the subtractive color processes used to generate a color hardcopy image. A conventional negative-to-positive process is shown in FIG. 4*a* and a direct positive is shown in FIG. 4*b*. Details of these image forming paths are described in general photographic references such as "The Theory of the Photographic Process", 4th Edition, T. H. James, editor, Macmillian Publishing Co., Inc., 1977, with specific reference to FIG. 12.3. More specifically, a first step in forming a color-photographic image is to record the blue, green and red content of the scene in spectrally sensitized emulsions that have blue, green, and red light sensitivity. A typical manner of handling the three sensitive emulsions is to place them in a multilayer arrangement. The usual layer order arrangement for the camera-originating film is the blue-light recording layer on top, the green light recording layer between the blue light recording layer and the red light recording layer, and the red light recording layer below the green light recording layer with all of these layers above a transparent support.

When a picture is taken (i.e., an image is captured) of an object consisting of a blue, a green, and a red patch, blue light will expose the blue-sensitive emulsion and form a latent image in the blue sensitive layer. Green light will not affect the blue sensitive emulsion but will expose the green sensitive emulsion and form a latent image in the green sensitive layer. Red light has no effect on the two upper emulsions but will expose the red sensitive emulsion layer and form a latent image in this layer.

The resultant exposure will yield a negative image of the scene if the chemical processing steps used to treat this exposed film is similar to the color negative processing sequence known as Process C41. In this processing sequence, the exposed silver is developed in a color developer which forms metallic silver and subtractive color dyes, the metallic silver is oxidized to silver salt in the bleaching step and the silver salt and any undeveloped silver halide is removed by formation of water soluble silver salts during the fixing and washing steps. At the end of processing this film, a yellow dye remains in the blue-sensitive layer, a magenta dye remains in the green sensitive layer, and a cyan dye remains in the red sensitive layer as shown in FIG. 4*a*. This image is a negative image of the scene in that the red patch of the scene is now a cyan dye if viewed directly. The dye appears cyan because it absorbs red light. In order to create a positive print image that appears similar to the original scene from this negative film image requires another exposing and processing step using a similar subtractive color process. The conventional negative formed in the first processing step is placed in a printer that is then used to expose a piece of silver halide paper. For comparative purposes with the positive image obtained via the reversal processing step of FIG. 4*b*, the layer order of the paper color sensitive emulsions is depicted the same as it was for the camera original films only now these emulsions are coated on reflective support. In common practice, the paper emulsion system is often coated with the blue light sensitive layer and the red sensitive layer switched. White light passing through the cyan dye of the camera original negative film will have red light removed by the cyan dye formed in the film thus exposing the blue light sensitive layer and the green light sensitive layer of the paper. White light passing through the magenta dye of the camera original negative film will have green light removed by the magenta dye formed in the film thus exposing the blue light sensitive layer and the red light sensitive layer of the paper. White light passing through the yellow dye of the camera original negative film will have blue light removed by the yellow dye formed in the film thus exposing the green light sensitive layer and the red light sensitive layer of the paper. When the exposed paper is processed though a chemical process like Process EP-3, the exposed silver is developed in a color developer which forms metallic silver and the associated subtractive color dyes for that layer. The so-formed metallic silver is oxidized to silver salt and the silver salt and any undeveloped silver halide is removed by formation of water soluble silver salts in the steps following development. The resultant print image has a yellow dye formed in the blue-sensitive layer, a magenta dye formed in the green sensitive layer, and a cyan dye formed in the red sensitive layer of the paper as shown in the bottom of FIG. 4a. This image is a negative image of the negative film image obtained via the first process and thus is a positive image of the scene. When viewed, the red exposure of the scene now appears as a red image in the paper print because blue and green light are removed by the formed yellow and magenta dyes respectively. Similarly, the green image of the scene appears as a green image in the paper print, and the blue image in the scene now appears as a blue image in the paper print.

For the conventional direct positive of FIG. 4b, the resultant scene exposure will yield a positive image of the scene if the chemical processing steps used to treat this exposed film are similar to the color reversal processing sequence known as Process E6. In this case, the chemical processing sequence uses a black and white developer as the first developer to convert the exposed silver halide into metallic silver without concomitant dye formation. The remaining undeveloped silver halide is then fogged either chemically or with a light exposure and the film is then processed in a color developer that converts the remaining silver halide into metallic silver while simultaneously forming the subtractive color dyes. In this case, most of the coated silver halide used in the film has been converted to metallic silver. This metallic silver is then oxidized to a silver salt and the silver salt is then converted to a water soluble form during fixing. At the conclusion of the chemical process, the red patch of the scene that exposed the red light sensitive layer has no cyan dye while the unexposed blue and green light sensitive layers have formed yellow and magenta dyes respectively. The green patch of the scene that exposed the green light sensitive layer has no magenta dye while the unexposed blue and red light sensitive layers have formed yellow and cyan dyes respectively. The blue patch of the scene that exposed the blue light sensitive layer has no yellow dye while the unexposed green and red light sensitive layers have formed magenta and cyan dyes respectively. When viewed with white light, this positive image will transmit red light where there is no cyan dye formed and thus the red patch in the scene will look red in this image. That is, for the direct positive, the negative image that was originally recorded in the camera was reversed to a positive image in the chemical processing cycle.

Film writer 16 can be configured to use either of these conventional subtractive color films.

The photosensitive medium needs to be chemically processed. Therefore, at step 104 shown in FIG. 3, the at least one exposed film image is physically transported to a chemical processor. Transportation of the at least one exposed film image can be accomplished using known mechanical transportation means. For example, leader cards or conveyor belts are commonly known in the trade. Alternatively, an edge drive such as disclosed in U.S. Pat. No. 6,352,188 or pinch rollers and rails as well as the film loading mechanism as disclosed in commonly assigned U.S. Pat. No. 6,485,202 could be used.

Once transported to the chemical process, the at least one exposed film image is automatically chemically processed to generate a film output image. This output image can be a photosensitive film negative or a photosensitive film positive (step 106). Chemical processing of an exposed film image is well known. Such chemical processing may be dependent on the material on which the exposed film image is contained. For example, for conventional color negative films, a typical film processing cycle is Process C-41 or its Rapid Processing equivalents, for reversal images that generate a positive image after process a typical processing cycle is E-6, for Eastman color negative film the typical processing cycle is ECN-2, and the like. Such linkages of a film type with a defined processing cycle are well known in the trade. In one embodiment of the system 10 design, one film type and its associated processing sequence and chemicals are used in one system 10.

Alternatively, if the processor used in system 10 is a single tank processor (such as described in commonly assigned U.S. Ser. No. 09/920,495 titled, Processing Photographic Material), both subtractive color films can be used within one system 10 configuration. This processor type provides a single, self-cleaning processing reservoir that can be employed with typical chemical processing configurations known to those skilled in the art. In this case, the film writer can be equipped to write either a negative image of the digital information or a positive image of the digital information or both on the corresponding film media depending on the customer's request. The at least one film writer exposed image on one of the film types is then processed in the single tank processor using the chemicals and processing sequence associated with this film type. When this processing sequence is completed, the processed images are delivered to the customer and the next processing order is activated. The chemical processing solutions for each film type are each present in system 10. The customer's selection of the film type desired for archival storage of the digital image causes the system to select the process chemicals and processing steps needed to convert the exposed image into an archival film image. In this case, the customer receives the type of image desired for archival storage using one film writer processor.

The method shown in FIG. 3 can include additional steps. For example, if a plurality of digital images is accessed at step 100, these plurality of images can be displayed on image display device 14 for selection by the user of the at least one image. If display 15 is a touchscreen, the selection can be accomplished by the user touching the display to indicate the particular image to be selected. Alternatively, keyboard 30 may be used to provide information and data.

If system 10 includes payment device 26, then the method of FIG. 3 can include the step of receiving payment. This step can be accomplished at any time. For example, payment can be received prior to the accessing of the at least one image in digital form, or at the delivery of the film output image to the user.

The method of the present invention can also include the step of associating an identifier with the at least one image so as to add labels to the image, identify image content, or add user defined searchable labels that the user can then use for record retention and retrieval purposes. Digital information about the image content can be of several forms. Meta data that is related to the image pixels is used to generate the image for the film writer and therefore need not be retained. Other meta data is associated with the overall image itself. Therefore, the film writer recorded information can include recorded data such as the labels and tags that consumers use to identify the image content or the automatic time and date stamps of the camera. Thus the list of such film writer recorded data can include subject names, dates, location, the occasion for the recorded image, and the like.

If system 10 includes both a positive processing sequence and a negative processing sequence, then the system need not be limited to processing only film from the film writer alone. That is, the conventional processing chemicals available in system 10 provide a means for system 10 to also process exposed, but unprocessed, customer films. In this instance, an original film processor is combined with the film writer and film writer processor to create a single service device.

In a preferred embodiment, the film processor uses processing profiles, such as those described in U.S. Pat. No. 6,520,694 (U.S. Ser. No. 10/051,074), commonly assigned, incorporated herein by reference. That is, the photographic process is adjusted for members of a family of photographic films to process each member of the film family. Such processing can have an advantage of providing a short processing time.

More particularly, within the silver halide-based imaging system there includes two general use categories. One of these use categories is the film-based system for camera use such as described in FIGS. 4a and 4b, and the other is the paper-based system used in printers. Within these use-categories are standardized processing cycles and associated processing hardware that convert the recorded silver-halide image into a useable image. For color negative still photography, such a standardized processing cycle is Process C-41. For reversal still photography, such a standardized processing cycle is Process E-6. For color negative motion imaging photography, such a process is Process ECN-2. In the context of this historical hierarchy and standardization, a family of films would be all films that are intended to be processed using a specific, standard processing cycle. For example, all color negative films for still photography represent a family of films that are to be processed within the trade reference Process C-41. Film manufacturers might formulate their products to provide satisfactory results using such standardized process cycles even though optimum performance for a particular film formulation may be achieved under different conditions than obtained in a standardized process cycle.

A processing profile for a given member of a film family may be optimized for minimum processing time, minimum chemistry usage, or energy efficiency. A processing profile that is optimized for one member of a film family may not be optimum for another member. For example, if the processing profile was optimized for a criterion of stable densities for the given member, the processing profile may not produce stable densities for another member. When a film is processed using a processing profile according to the present invention, it is important that there be no ambiguities in assigning the color value for each exposure. Therefore, it is preferred that the processing profile reproducibly generate the same densities for equivalent exposures on the same film. Likewise, it is preferred that any post-development treatment (e.g. bleach and fixing steps) yield stable densities. For example, under-bleaching (bleach concentration too low, too little bleach time, difficult to bleach silver) can lead to retained silver. The color density of the retained silver is added to the color density of the image resulting in an increase in density for that color record. This summed density would not map correctly to the standard chemical process if the mapping function is determined using a processing profile in which retained silver is not present. Such a change is referred to as an unstable density. If the processing profile uses a bleaching step and this step is extended in time, for instance, then this retained silver could be removed and its color contribution eliminated. Alternatively, one can use a more concentrated bleaching agent or a higher volume of a given solution, or a higher temperature. These adjustable parameters can be varied to produce a processing profile that is customized for a particular member of a film family. Stable densities are important for color mapping to yield preferred results. A stable density is defined as that obtained from repeatable development conditions that are substantially free of density changes that might occur if the post development steps associated with the processing profile are extended in time.

Thus according to at least one embodiment of the present invention, a plurality of processing profiles are provided having different value of the adjustable parameters for different members of the film family.

The film family is defined based on the film's use such as the family of color negative films used in still photography. We separate film members within this family classification based on processing profiles. One family of films is known collectively as color negative films used in still photography. The processing profile may be customized for one film or may be useful for a number of films. The processing profiles may be used to provide, for example, near real time processing, low chemical consumption, or low energy utilization. In our preferred embodiment, these processing profiles are used for near real time processing of color negative films used in still photography. Different chemical packages are present in system 10 to provide for both reversal and color negative film family processing. In this arrangement, system 10 provides a spectrum of services from original film processing, scanning, digital printing, and conversion of digital image files to film based images with the film writer for archival storage using s single tank processor, processing profiles, and appropriate chemicals.

Figure 5:
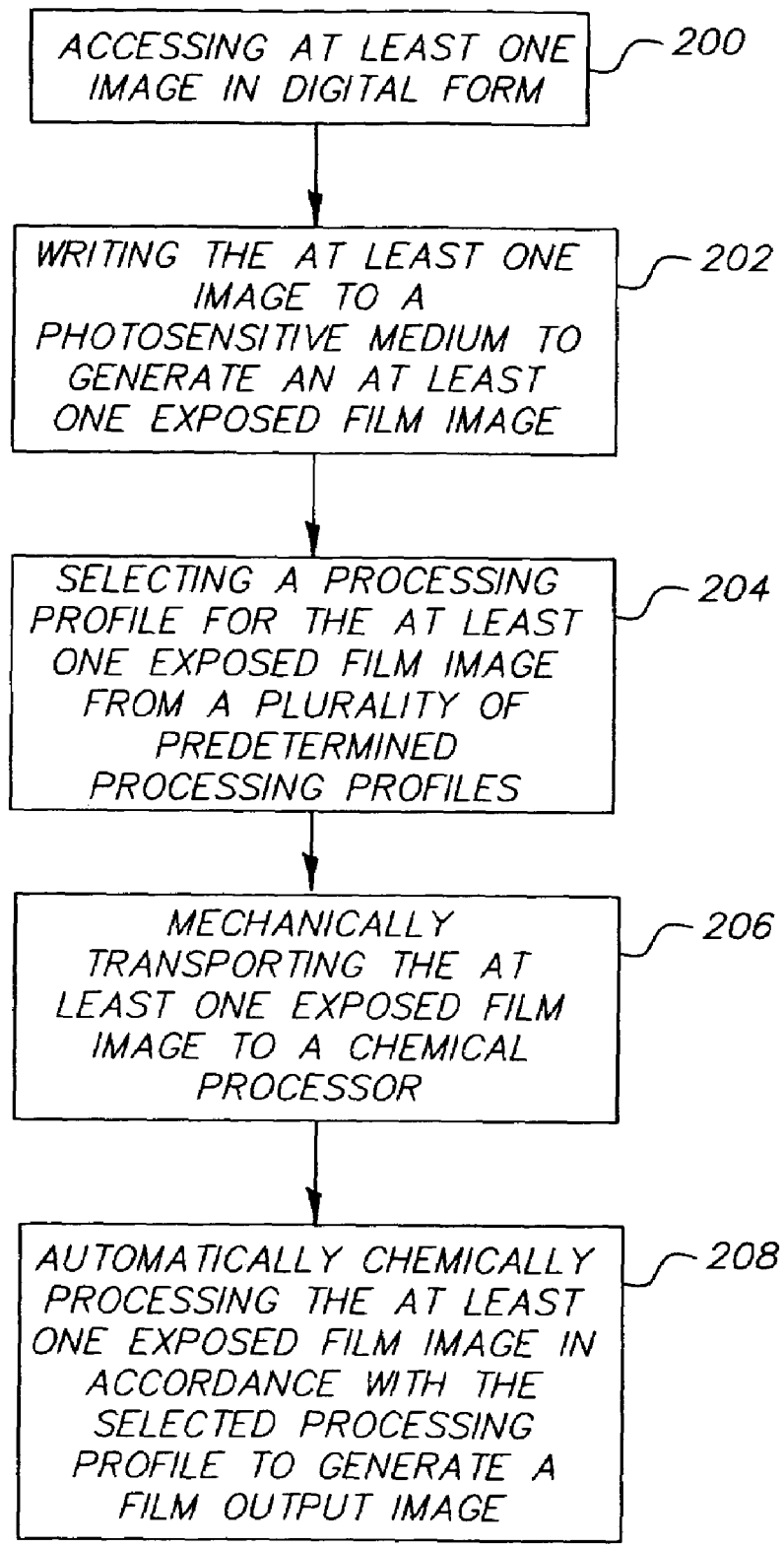
FIG. 5 shows a flow diagram of a method in accordance with a second embodiment of the present invention employing processing profiles.

FIG. 5 shows a flow diagram of an image processing method in accordance with a second embodiment of the present invention wherein processing profiles are employed. At step 200, at least one image in digital form is accessed. At step 202, the at least one image is written to a photosensitive medium to generate an at least one exposed film image. A processing profile for the at least one exposed film image is selected from a plurality of predetermined processing profiles (step 204). At step 206, the at least one exposed film image is transported to a chemical processor, whereby the at least one exposed film image is automatically chemically processed in accordance with the selected processing profile to generate a film output image (step 208).

Figure 6:
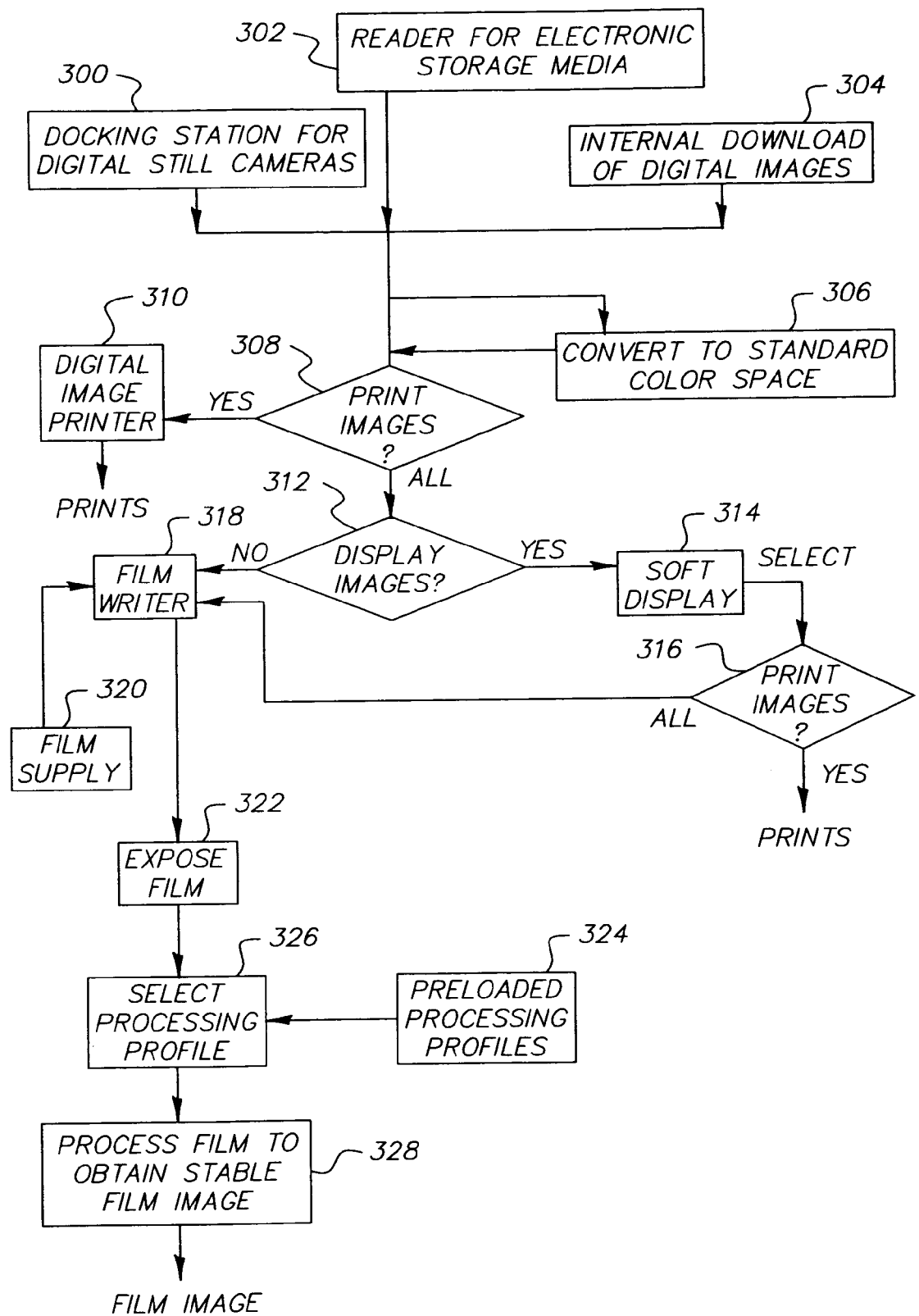
FIG. 6 shows a diagram further describing the method of FIG. 4.

FIG. 6 shows a diagram more particularly describing the method of FIG. 5.

As indicated at step 200 of FIG. 5, at least one digital image in digital form is accessed. This digital image can be accessed by various means, including but not limited to, directly from a digital still camera by means of a docking station (block 300), from a storage medium (block 302), or from remote device 22 using communication network 24 (block 304) of FIG. 6.

It is recognized that digital image data (i.e., an input digital signal) is already a color rendition (red, green, and blue) of the content of the image. However, the digital image data recorded by the camera manufacturer need not be in a standardized color space. When it is not standardized, the data associated with the image, often called meta data, is required to aide the image processing software in rendering the image for either image display or printing. However, the meta data along with the image data can also be used to convert the digital image color rendition into a standardized color space (block 306) such as CIELAB color space and this image then is rendered for recording by the film writer. Such standardization can reduce the amount of information that would have to be recorded by the film writer.

The user can request that the accessed digital image be printed (block 308). If the user places such a request, the digital image data is transmitted to an output device configured as a printer whereby the requested prints are generated (block 310). The printer can be local or remote to system 10. If located remotely, communication network 24 can be employed for the transmission.

The user can also request that the accessed digital image be displayed on display 15 (block 312). If the user places such a request, the digital images are displayed (block 314) whereby the user can select at least one of the displayed digital images to send to the digital image printer (block 316).

The user also selects at least one digital image for the generation of a film output image in accordance with the present invention (block 316). Note that the digital image selected for the generation of the film output image does not need to be displayed; the user can continue the method of the present invention without displaying the accessed digital image data.

As indicated in FIG. 5 at step 202, the at least one image is written to a photosensitive medium to generate an at least one exposed film image. In FIG. 6, film writer 16 is employed (block 318). Film from a film supply (block 320) is supplied to film writer 16 at block 318. The film of the film supply is a silver halide based film. At block 322, the film is exposed using film writer 16 to generate the at least one exposed film image of step 202 derived from the digital image data.

A plurality of predetermined processing profiles are stored locally, such as on storage device 13, or remotely on remote device 22 (block 324). This plurality of processing profiles is accessed, and a particular processing profile is selected (block 326). The selection can be based on the film supply. That is, which processing profile is selected is dependent on the film being written to by film writer 16. The profile defines the plurality of conditions used to operate film processor 18.

As indicated in FIG. 5 at step 206, the at least one exposed film image is physically/mechanically transported to processor 18, whereby the at least one exposed film image is automatically chemically processed in accordance with the selected processing profile to generate a film output image (step 208). More particularly, processor 18 converts the exposed silver halide into a stable film image that is delivered to the user (block 328).

The film output image can be a direct positive image such as obtained with reversal film or the film output image can be a negative image such as obtained with color negative film for integral color images. Alternatively, the film writer could write each red, green, and blue color channel separately. If written separately, the image could be a color record as obtained with the reversal film for a positive image or color negative film for a negative image. Still further, these separate exposures could be recorded as simple silver images with black and white film.

With regard to the film of the film supply (block 320), the film characteristics that are desired for optimal recording and storage using an integral film recording medium include (1) little or no optical cross-talk, (2), little or no chemical cross-talk, (3) low granularity, (4) low radiation sensitivity, and (5) good thermal and high humidity keeping characteristics. Items (1) and (2) are directed to signal purity, item (3) is directed to noise, and items (4) and (5) are directed to stability keeping characteristics.

That is, it is preferred that there is little or no optical cross-talk during exposure. Scattered light, resulting from the turbidity of the emulsions used to record the red, green and blue spectral response, can degrade the image sharpening.

It is also preferred that there is little or no chemical cross-talk during development. Chemical cross-talk is advantageously used in color films to correct for color deficiencies within the photographic system. Use of image modifiers, masking couplers, and released halide from the developing silver centers are intentionally optimized such that development in one color record suppresses color development in an adjacent color record. That is, the chemical processing intentionally confounds the red, green or the blue exposures with the other color record exposures. Given that the digital image had already been electronically processed into standard red, green, and blue images, such chemical cross-talk would degrade the pure references.

Preferably, film used in the system of the present invention would have low granularity. Granularity is the equivalent of noise in an information system. Low granularity is preferred so that there is no introduction of noise into the recorded image by the film itself.

Low radiation sensitivity is also preferred. Silver halide is capable of recording radiation exposure caused by high intensity exposing radiation such as x-rays or gamma rays. Such exposure leads to fog growth in the film which itself is a source of noise. Additionally, high sensitivity to such radiation sources shortens the shelf life of the film leading to more frequent changes of the film supply in the film writer than would be needed for films having lower radiation sensitivity.

Good thermal and high humidity keeping characteristics are also preferred.

Thus, the film supply can provide film of different film types. Dependent on the user's criteria of concern, one film type might be preferred over a different film type. Criteria can include longevity, fast processing, stable film color, and the like. As such, one film process might be applied to different film types. Similarly, the same film type can be processed by different processes.

Figure 7A:
FIGS. 7a–7g show examples of film output images that can be generated in accordance with the present invention.
Figure 7B:
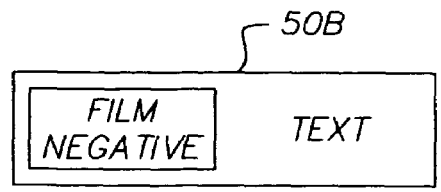

It is noted that the film output image generated by the method of the present invention is preferably a film negative since such a film negative provides for long-term archivability. As shown in FIG. 7a, a film output image 50A can comprise a film negative. In addition, as shown in FIG. 7b, film output image 50B can comprise an image area including the film negative and a text area for the inclusion of textual information. Such textual information can include user information such as user name and/or address, processing information, retailer/processor name and/or address, pricing information, payment method, image content information (e.g., "Sally's first birthday party", "Christmas Year 2000"), and the like. Such textual information can include alphabetic characters, numerical characters, alphanumeric characters, symbols, icons, and the like. Textual information might also be written directly on the film negative.

Similarly, the film output image can comprise a positive image.

Figure 7C:
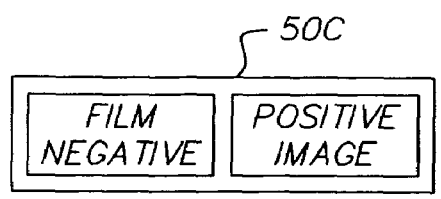

Further, the film output image can comprise a positive image and film negative. For example, as shown in FIG. 7c, film output image 50C includes a first image area for a film negative and a second image area for a positive image. FIG. 7c shows the first image area being different than the second image area; the image areas can spaced from each other, or they can abut, proximate, or be adjacent. Preferably, the positive image is a positive of the film negative. That, the positive image and film negative comprise the same image content. Such a film negative and positive image are preferably disposed proximate each other on the same (i.e., single) photosensitive medium and provide both archival stability and easy to read visual display. With such an arrangement, the positive image can provide the user with a quick reference of the content of the image while the film negative provides archival means. It is recognized that the film negative and positive image can be disposed on separate mediums, though the proximate positioning provides for ready archiving. If disposed separately, an identifier can be disposed on each of the separate mediums to assist in corresponding the film negative with its corresponding positive image. Preferably, the film output image is comprised of a single photosensitive medium. The film output image shown in FIGS. 7a–7g can be referred to as a photographic article or a photographic image.

Figure 7D:
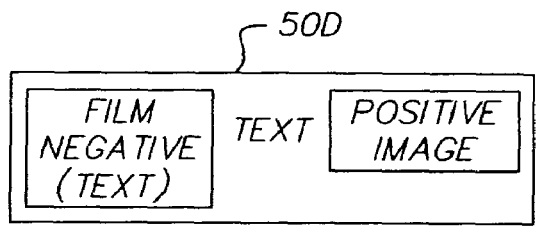

Textual information can be included with the film negative and positive image, as shown in FIG. 7d showing film output image 50D.

Figure 7E:
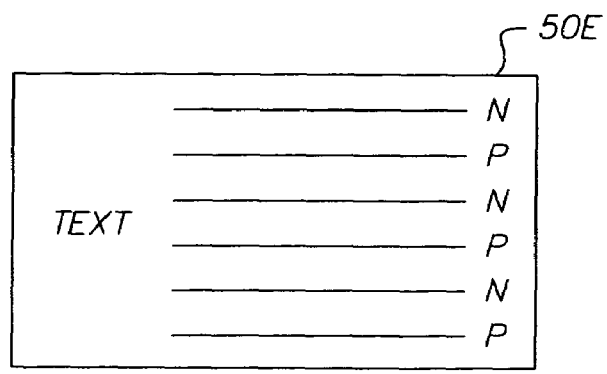

As shown in FIG. 7e, an image can be comprised of interlaced film negative and positive image. That is, both the film negative and positive image are within the same image area/space.

Figure 7F:
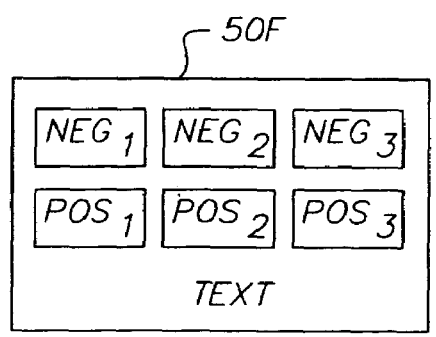
Figure 7G:
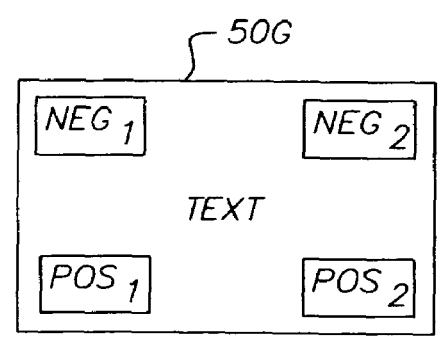

FIGS. 7f and 7g show film output images 50F and 50G, respectively, including a plurality of film negatives and positive images. As shown, a film negative can be disposed proximate a corresponding positive image. Alternatively, the plurality of film negatives can be disposed proximate each other (i.e., grouped), and similarly, the plurality of positive images can be disposed proximate each other (i.e., grouped). Other arrangements may be known.

The film negative for film output images 50A–50D is obtained using the method disclosed above with reference to FIGS. 3–6.

Figure 9A:
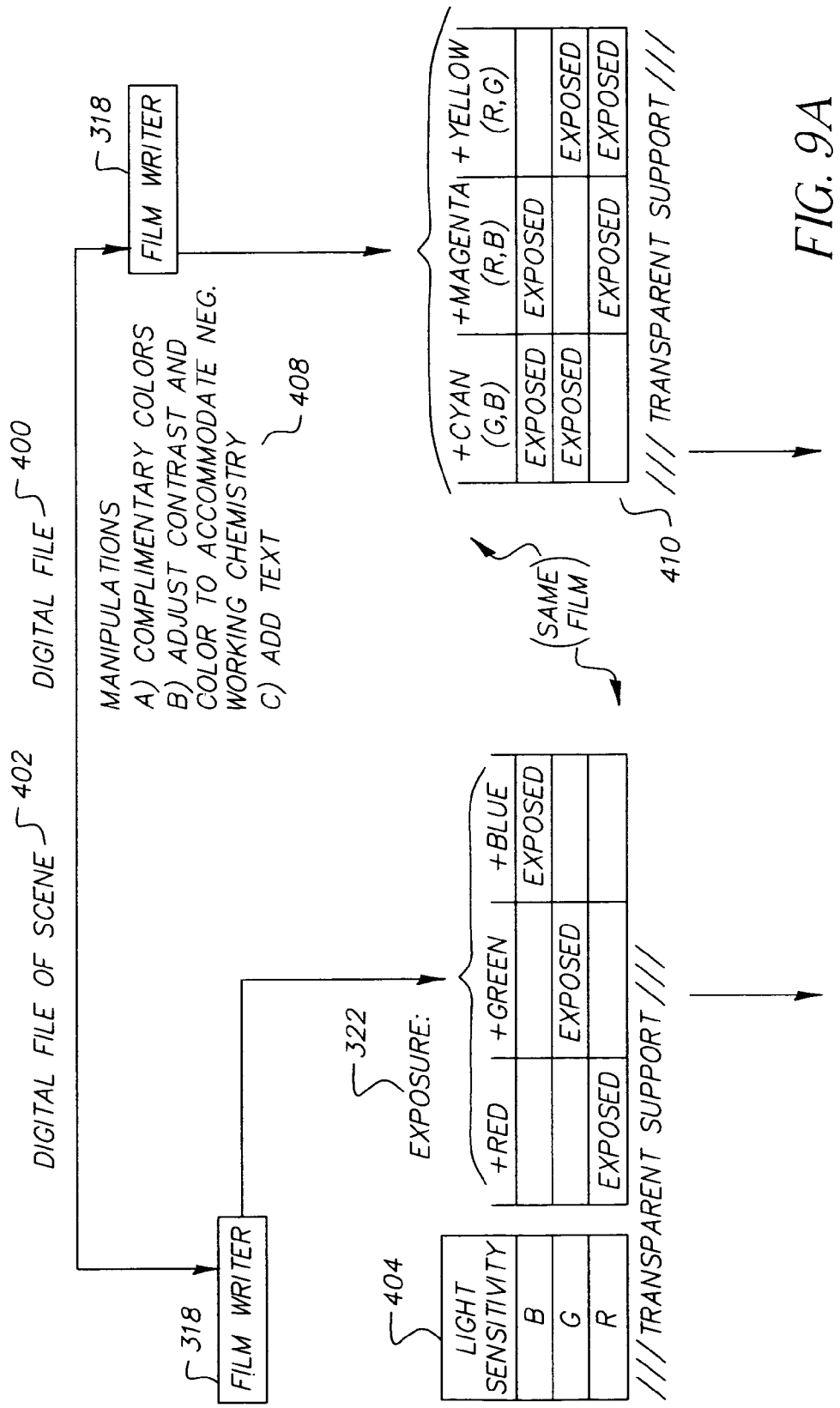
FIGS. 9A and 9B show a diagram of a third embodiment in accordance with the present invention that combines a negative and a positive image on one film using one chemical processing system.
Figure 9B:
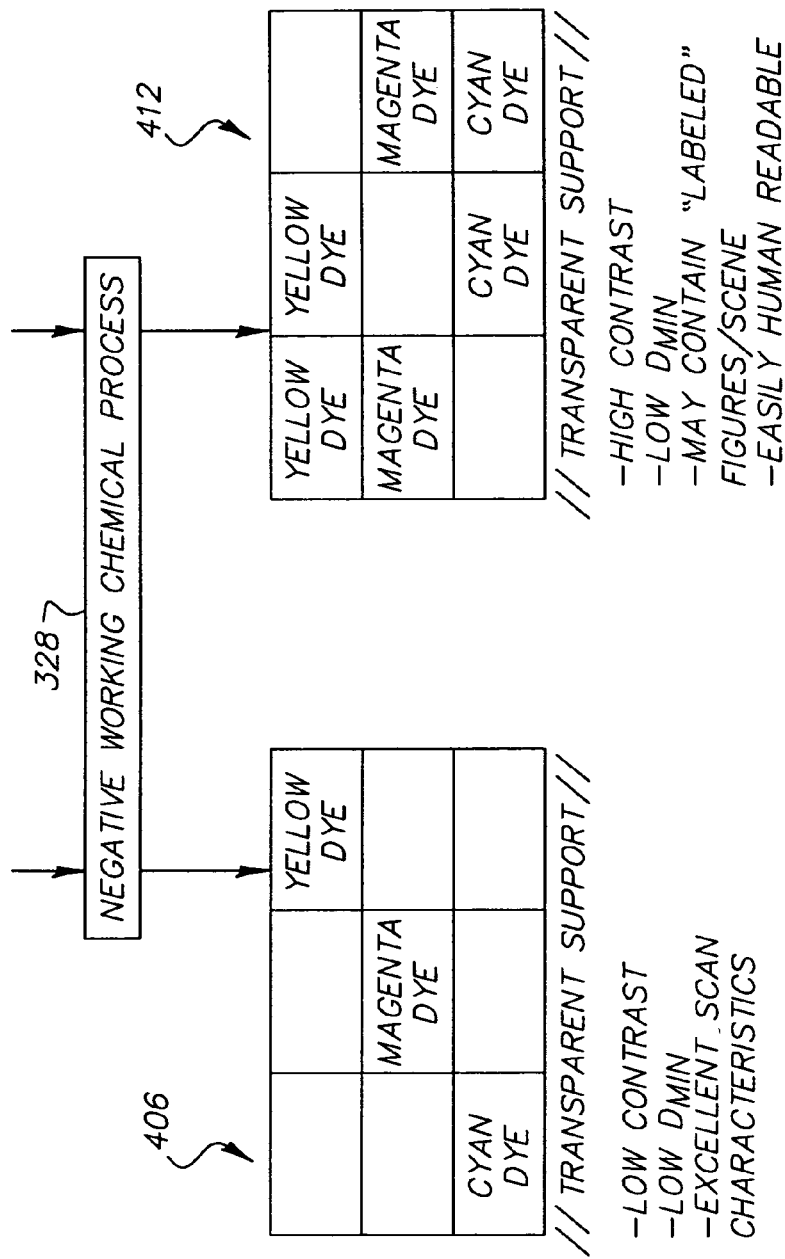

The generation of film output images 50C, 50D, 50E, 50F, and 50G are more particularly described below with reference to FIGS. 9A and 9B.

While the methods described above have been directed to automated methods and stand-alone devices, a further embodiment of the present invention can be employed by retailers, wholesale photofinishers, and the like and is not limited to stand-alone systems. This embodiment is directed to providing a photosensitive medium which can be whatever the user wants it to be. That is, one photosensitive medium can be provided which can be processed by a plurality of methods to generate a plurality of outputs.

The input signals for the film writer can come from digital files such as obtained from scanned color negative films, from scanned reversal films, from digital still cameras, from Photo CDs, mobile devices such as cellular phones and PDAs, memory cards, memory stick, and other digital sources known to those skilled in the art. The customer may want to have a color negative record of the digital image for archival storage and optical printing compatibility or a reversal image of the digital file for archival storage and human readability or may want both. FIG. 8 outlines, in tabular form, several combinations that could be obtained using existing technology or, in a preferred embodiment, a new film that allows both image formats (color negative and reversal) to be present on one film as described in FIGS. 7c and 7d. Both images could, in fact, be included within one image frame.

The film writer combined with the film processor, according to the present invention, could be designed to operate with a color negative film as the film on which the digital scene is written and then this film is processed using existing color negative processing that is also part of the system. In this instance, only color negative images are obtained as output from this device. If existing color negative film is used as the film for the film writer, then the film itself will be colored because of the common practice of using colored masking couplers as part of the conventional color negative film design. The resultant film writer image would then preferably be a negative image of the scene as previously described in FIG. 4a. Alternatively, the film writer combined with the processor according to this invention could be designed to operate with a conventional reversal film as the film on which the digital scene is written and then this film is processed using existing reversal processing that is also part of the system. In this instance only a reversal image is obtained as output from this device. The resultant image is a positive image of the scene as previously described in FIG. 4b. This image is more readily human readable than the color negative image. The color negative image, having lower overall contrast than the positive image, tends to be more easily read by film scanners because of the reduced dynamic range of density. These approaches can be considered as technology pure, that is, the combination of a given film with its trade-recognized process will not provide a combined color negative and positive image on one piece of film although both types of output could separately be present within one film writer and film processor. For example, a system as described in U.S. Pat. No. 6,520,694 (U.S. Ser. No. 10/051,074), commonly assigned, incorporated herein by reference, could be used.

In the present invention, one film and one process could be used in the film writer to obtain both a color negative rendition of the scene that is optically printable and easy to read with low dynamic range scanners and a positive image rendition of the scene that is of higher contrast and human readable. Referring now to FIGS. 9A and 9B, for illustration purposes only, envision a digital file (block 400). The digital file of the scene (block 402) is a scene image comprising red, green and blue patches. Not shown in FIGS. 9A and 9B is the computer that manages the digital information and readies it to be sent to film writer 16 (at block 318) to obtain a negative image. Film writer 16 exposing device exposes the film to red, green and blue light (as illustrated in block 404 of FIG. 9A and described in FIG. 4a) resulting in an exposure in the red sensitive layer, the green sensitive layer, and the blue sensitive layer, respectively. The exposed film is processed in a negative working chemical process (block 328 in FIG. 9B) such as Process C41. Examples of processes that can be employed include those described in U.S. Pat. No. 6,520,694 (U.S. Ser. No. 10/051,074), commonly assigned, incorporated herein by reference. The process yields a cyan image in the red sensitive layer, a magenta image in the green sensitive layer, and a yellow image in the blue sensitive layer (as illustrated in block 406) of FIG. 9B and described in FIG. 4a. The resultant image has the low contrast of a color negative film suitable for scanning and can be optically printed. The film used in the film writer in this example is built using a clear, transparent support in order that the direct positive image is readily human readable. Therefore, the negative image just obtained would not have the colored masking couplers used in conventional color negative film. The film writer could also expose the transparent film used in the film writer to generate a color mask density in addition to the image information obtained from the digital image file. In this instance, the color negative exposure would also look like a conventional color negative film. Such a mask may be helpful if the resultant image is to be subsequently printed again using a standard setup on an optical or a digital minilab which assumes that a mask is present when it balances the film for printing in the conventional manner.

In addition to the color negative image for archival storage, film writer 16 could write on the next frame or, preferably, in the same frame, a positive image of the same scene. Such an image tends to have higher contrast than the color negative image and is human readable because it looks like the original scene as described in FIG. 4b. It is noted that in the conventional subtractive color system that renders a positive image of the scene, the chemical processing conditions are changed in order to obtain the reversed image that is common at the time of exposure to both the color negative and the reversal film. To accomplish using one subtractive color film and one negative working chemistry, the digital file of the scene is reversed. Accordingly, the computer that manages the digital file converts the image information into its complementary colors, that is, the red is converted to cyan, the green to magenta, and the blue to yellow as described in FIG. 9A at block 408. That is, the digital file is manipulated such that the negative image is computationally reversed rather than chemically reversed. Additionally, in this step the overall contrast of the digital image may have to be increased to be more like that obtained as a conventional positive image for human readability and any desired text, either in the image area or adjacent to it can be added. This complementary image is then sent to film writer 16 (block 318). The red scene information is converted to its complementary image causing the film writer to exposure the green sensitive and the blue sensitive layers of the subtractive color film used in the device (block 410 in FIG. 9A). The green scene information is converted to its complementary image causing the film writer to exposure the red sensitive and the blue sensitive layers of the subtractive color film used in the device. The blue scene information is converted to its complementary image causing the film writer to exposure the red sensitive and the green sensitive layers of the subtractive color film used in the device. The exposed film is then processed in the common negative working chemistry (block 328) of this example resulting in dye formation within each exposed image layer as shown in block 412 of FIG. 9B. This image is the reverse of the negative image (at block 406). It is a positive image of the scene as described in FIG. 4b which makes it and the accompanying text easily human readable.

Image processing is done using a programmed computer such as CPU 17. The program may contain at least one image processing algorithm, for example, an algorithm for red-eye detection and/or correction, tone scale adjustment, and/or contrast adjustment. A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

As indicated above, system 10 can include means 36 for receiving exposed (but unprocessed) photosensitive medium, for example, exposed 35 mm or APS film. System 10 can employ the features of the present invention to generate a film output image from the exposed film image. As such, system 10 is adapted to generate a film output image from an analog input (i.e., an exposed film image) or a digital input (i.e., a digital image).

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10 image processing system
12 digital reader
13 storage device
14 image display device
15 image display
16 film writer
17 central processing unit (CPU)
18 processor
20 output device
22 remote device
24 communication network
26 payment device
28 scanner
30 keyboard
32 input port
34 delivery area
36 means

What is claimed is:

1. A method of making a photographic article which comprises at least one image, the method comprising the steps of:
    obtaining a digital image, said digital image having a digital file that represents a scene;
    exposing a photographic film with said digital image to generate a negative image of said digital image on said photographic film;
    reversing said digital file to create a positive image of said digital image;
    exposing said photographic film with said positive image;
    processing said photographic film through a same chemical process to obtain a processed photographic article that comprises said negative image on a first image area of said film and said positive image on a second image area of said film.

2. The method of claim 1, further comprising the step of:
    providing a text area on the film for receiving textual information associated with the digital image.

* * * * *